United States Patent
Freisthler et al.

(10) Patent No.: US 9,582,575 B2
(45) Date of Patent: Feb. 28, 2017

(54) SYSTEMS AND METHODS FOR LINKING ITEMS TO A MATTER

(75) Inventors: Andrew Freisthler, Panama City Beach, FL (US); Martin R. Kilmer, Waynesboro, VA (US); Mark David Wasson, Seattle, WA (US); E. Scott Wetzel, Seattle, WA (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 1454 days.

(21) Appl. No.: 13/104,154

(22) Filed: May 10, 2011

(65) Prior Publication Data
US 2012/0011427 A1    Jan. 12, 2012

Related U.S. Application Data

(60) Provisional application No. 61/363,027, filed on Jul. 9, 2010.

(51) Int. Cl.
*G06F 17/30* (2006.01)

(52) U.S. Cl.
CPC .. *G06F 17/30728* (2013.01); *G06F 17/30014* (2013.01)

(58) Field of Classification Search
CPC .................. G06F 17/30014; G06F 17/2235
USPC .................. 715/205, 206, 208; 707/726, 830
See application file for complete search history.

(56) References Cited

U.S. PATENT DOCUMENTS

| | | | |
|---|---|---|---|
| 5,771,378 A | 6/1998 | Holt et al. | |
| 5,794,236 A | 8/1998 | Mehrle | |
| 5,819,260 A | 10/1998 | Lu et al. | |
| 5,926,811 A | 7/1999 | Miller et al. | |
| 6,122,647 A | 9/2000 | Horowitz et al. | |
| 6,138,129 A | 10/2000 | Combs | |
| 6,154,213 A | 11/2000 | Rennison et al. | |
| 6,295,542 B1 | 9/2001 | Corbin | |
| 6,370,551 B1 | 4/2002 | Golovchinsky et al. | |
| 6,772,139 B1 | 8/2004 | Smith, III | |
| 7,043,489 B1 | 5/2006 | Kelley | |
| 7,054,858 B2 | 5/2006 | Sutherland | |
| 7,065,514 B2 | 6/2006 | Yang-Stephens et al. | |
| 7,272,594 B1 | 9/2007 | Lynch et al. | |
| 7,275,061 B1 | 9/2007 | Kon et al. | |
| 7,308,643 B1 | 12/2007 | Zhu et al. | |

(Continued)

*Primary Examiner* — Scott Baderman
*Assistant Examiner* — Seung Jung
(74) *Attorney, Agent, or Firm* — Dinsmore & Shohl LLP

(57) ABSTRACT

Disclosed herein are systems and methods for linking items into common matters. Some embodiments of the systems and/or methods may retrieve an electronic document from a source, determine whether the electronic document is associated with a predetermined first matter, and in response to determining that the electronic document is associated with the predetermined first matter, link the electronic document to the predetermined first matter. Similarly, in some embodiments, the systems and methods may further create a second matter and may link the electronic document to the second matter, such that accessing the electronic document can provide other documents linked to the second matter, receive a request for the electronic document, and in response to receiving the request for the electronic document, provide a user option to provide access to the other documents linked to the predetermined first matter.

20 Claims, 16 Drawing Sheets

(56) References Cited

U.S. PATENT DOCUMENTS

| | | |
|---|---|---|
| 7,412,463 B2 | 8/2008 | Mitchell et al. |
| 7,426,687 B1 | 9/2008 | Schultz et al. |
| 7,447,713 B1 | 11/2008 | Berkheimer |
| 7,451,135 B2 | 11/2008 | Goldman et al. |
| 7,499,934 B2 | 3/2009 | Zhang et al. |
| 7,509,306 B2 | 3/2009 | Boettiger |
| 7,814,102 B2 | 10/2010 | Miller |
| 8,090,705 B1* | 1/2012 | Panse ............................ 707/708 |
| 2003/0074351 A1* | 4/2003 | van Stegeren et al. .......... 707/3 |
| 2007/0168249 A1 | 7/2007 | Echard |
| 2008/0201632 A1* | 8/2008 | Hong et al. ................... 715/230 |
| 2008/0228535 A1 | 9/2008 | Hanes |
| 2009/0144246 A1* | 6/2009 | Kemp .............................. 707/3 |

\* cited by examiner

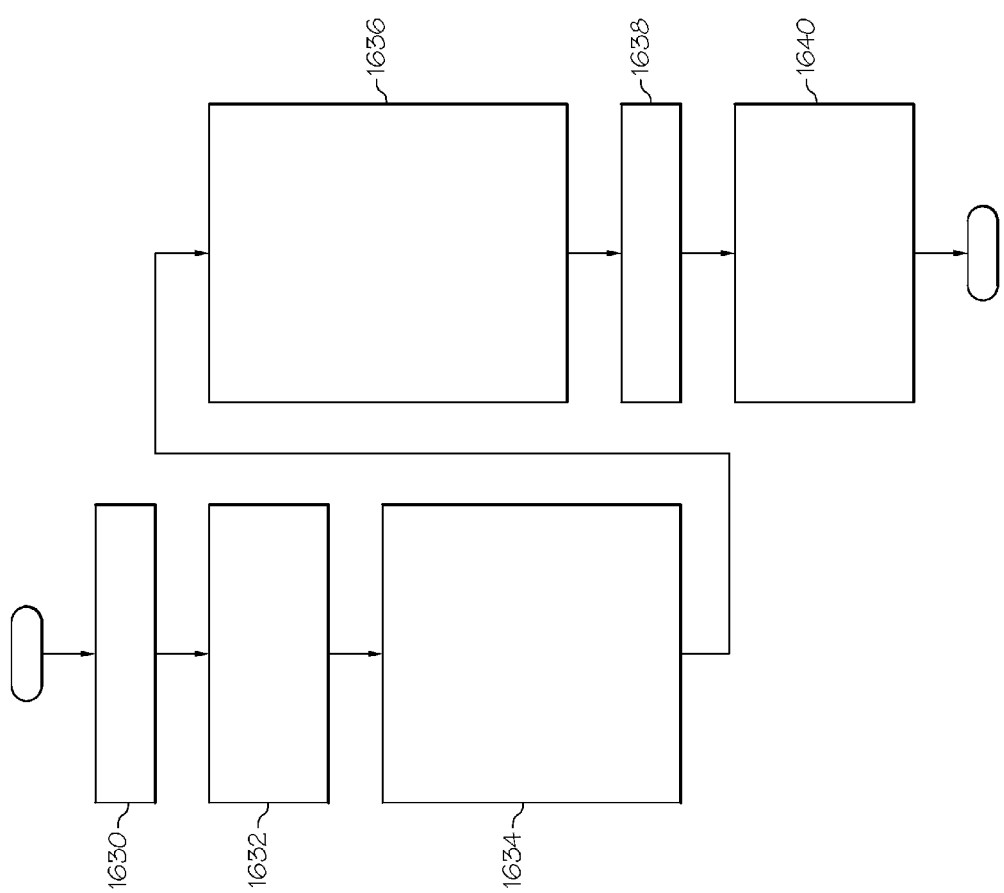

SYSTEMS AND METHODS FOR LINKING ITEMS TO A MATTER

CROSS REFERENCE TO RELATED APPLICATIONS

This application claims the benefit of priority under 35 U.S.C.§119(e) of U.S. Provisional Application Ser. No. 61/363,027 filed on Jul. 9, 2010, the content of which is relied upon and incorporated herein by reference in its entirety.

BACKGROUND

Field

Embodiments provided herein generally relate to linking electronic items into matters, and particularly to linking electronic legal documents and other legal and non-legal electronic data.

Technical Background

As electronic systems retrieve and store electronic documents for searching, many electronic documents pertaining to an event (such as a legal matter) may be obtained from a plurality of different sources. Additionally, as each of the sources may organize and/or label their documents differently, the electronic systems that retrieve these documents may be unable to associate documents from different sources to the common event. Accordingly, when attempting to organize the documents for later indexing, there may be no indicated relation of the documents. Thus, a user who attempts to locate all documents in the event may be forced to independently search for each document.

More specifically, many current electronic research systems may be configured to acquire electronic versions of legal documents from a plurality of sources. While one document may be retrieved from a court reporter, other documents may be received via public access to court electronic records (PACER) and/or from other sources. Consequently, the documents retrieved may be formatted in such a way that one cannot easily determine whether the documents are part of a common legal matter or whether they are unrelated. As such, in many current solutions, if an end-user of the electronic research system is searching for a complaint and a brief associated with that legal dispute, the search may become cumbersome due to the fact that two independent searches must be performed.

SUMMARY

As disclosed herein, embodiments of a method for linking items to a matter may include retrieving an electronic document from a source, determining whether the electronic document is associated with a predetermined first matter, and in response to determining that the electronic document is associated with the predetermined first matter, linking the electronic document to the predetermined first matter, such that accessing the electronic document will provide access to other documents linked to the predetermined first matter. Similarly, in some embodiments, the method further includes, in response to determining that the electronic document is not associated with the predetermined first matter, creating a second matter and linking the electronic document to the second matter, such that accessing the electronic document will provide other documents linked to the second matter, receiving a request for the electronic document, and in response to receiving the request for the electronic document, providing a user option to provide access to the other documents linked to the predetermined first matter.

In another embodiment, a system may include a computing device that includes a memory component that stores a content master that causes the computing device to retrieve an electronic document from a source and a linking component that causes the computing device to determine whether the electronic document is associated with a predetermined first matter. The linking component may additionally, in response to determining that the electronic document is associated with the predetermined first matter, link the electronic document to the predetermined first matter, such that accessing the electronic document will provide access to other documents linked to the predetermined first matter, and in response to determining that the electronic document is not associated with the predetermined first matter, create a second matter and link the electronic document to the second matter, such that accessing the electronic document will provide other documents linked to the second matter. In some embodiments, the memory component further stores search logic that causes the computing device to receive a request for the electronic document and, in response to receiving the request for the electronic document, provide a user option to provide access to the other documents linked to the predetermined first matter.

In another embodiment, a non-transitory computer-readable medium may store a program that, when executed by a computing device, causes the computing device to retrieve an electronic document from a source, determine whether the electronic document is associated with a predetermined first matter, and in response to determining that the electronic document is associated with the predetermined first matter, link the electronic document to the predetermined first matter, such that accessing the electronic document will provide access to other documents linked to the predetermined first matter. Similarly, in some embodiments, the program further causes the computing device to create a second matter and linking the electronic document to the second matter, such that accessing the electronic document will provide other documents linked to the second matter, receive a request for the electronic document, and in response to receiving the request for the electronic document, provide a user option to provide access to the other documents linked to the predetermined first matter.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 16 depicts a process that may be utilized for linking items to a matter, according to one or more embodiments shown and described herein.

DETAILED DESCRIPTION

Embodiments disclosed herein include systems and methods for linking items into legal matters. For example, one embodiment may be configured to determine first information related to a first legal document and second information related to a second legal document. The first information and the second information may include docket numbers and/or other identifiers. Additionally, the first information and the second information may be compared to each other and/or a repository of legal matters to determine a likelihood that the legal documents pertain to a common legal matter. If there is a likelihood that the legal documents pertain to the common legal matter, a relationship may be created between the two legal documents, such that when an end-user utilizes an electronic research system to locate the first document, the second document may be identified as also pertaining to the common legal matter and may be available to the end-user for review. Additional documents may also be determined and linked to the common legal matter.

Similarly, some embodiments may be configured to utilize a threshold system for determining whether a particular electronic document corresponds to a matter. As an example, various data may be extracted from the electronic document, such as party name, court docket number, judge name, document type, etc. Each of the extracted pieces of data may be weighted and an analysis may be performed on the extracted data to determine which of the extracted data corresponds to a predetermined matter, such as a legal matter. Based on the weighting and amount of extracted data that corresponds to the legal matter, a comparison to a threshold may be performed to determine whether the legal document should be included in the legal matter, not included in the legal matter, or should be subject to further analysis.

Figure 1:
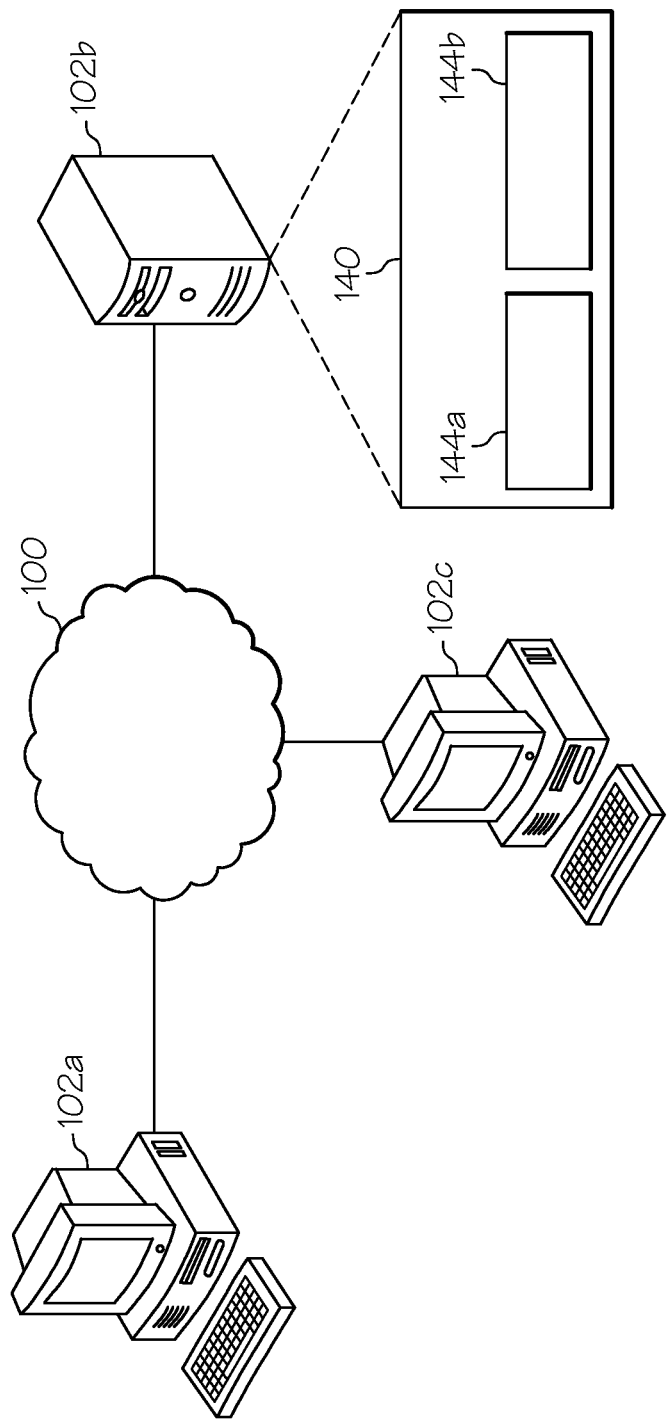
FIG. 1 depicts a computing environment for linking items to a matter, according to one or more embodiments shown and described herein.

Referring now to the drawings, FIG. 1 depicts a computing environment for linking items to a matter, according to one or more embodiments shown and described herein. As illustrated, a network 100 may be coupled to a user computing device 102a, a remote computing device 102b, and an administrator computing device 102c. The network 100 may include a wide area network and/or a local area network and thus may be wired and/or wireless. The user computing device 102a may include any portable and/or non-portable computing devices, such as personal computers, laptop computers, personal digital assistants (PDAs), mobile phones, etc.

Similarly, the remote computing device 102b may include a server and/or other computing device for providing information to the user computing device 102a via a request to the searching logic 144a. In some embodiments, the remote computing device 102b may be configured to provide an online research tool, such as a legal research website, individual research tool, business tool, etc. As discussed in more detail below, the remote computing device 102b may include a memory component 140 that stores searching logic 144a and system enterprise logic 144b to provide this functionality. The searching logic 144a may include software, hardware, and/or firmware for providing searching capabilities to users, such at the user computing device 102a. Similarly, the system enterprise logic 144b may include software, hardware, and/or firmware for linking items to a matter, as described in more detail below.

Additionally, the remote computing device 102b may provide information to the administrator computing device 102c for maintenance, monitoring, and/or other administrative actions. The administrator computing device 102c may be configured as a personal computer, server, PDA, mobile phone, etc.

It should be understood that while the user computing device 102a, the remote computing device 102b, and the administrator computing device 102c are represented in FIG. 1 each as a single component, this is merely an example. More specifically, in some embodiments, there may be numerous different components that provide the described functionality. However, for illustration purposes, single components are shown in FIG. 1 and described herein.

Figure 2:
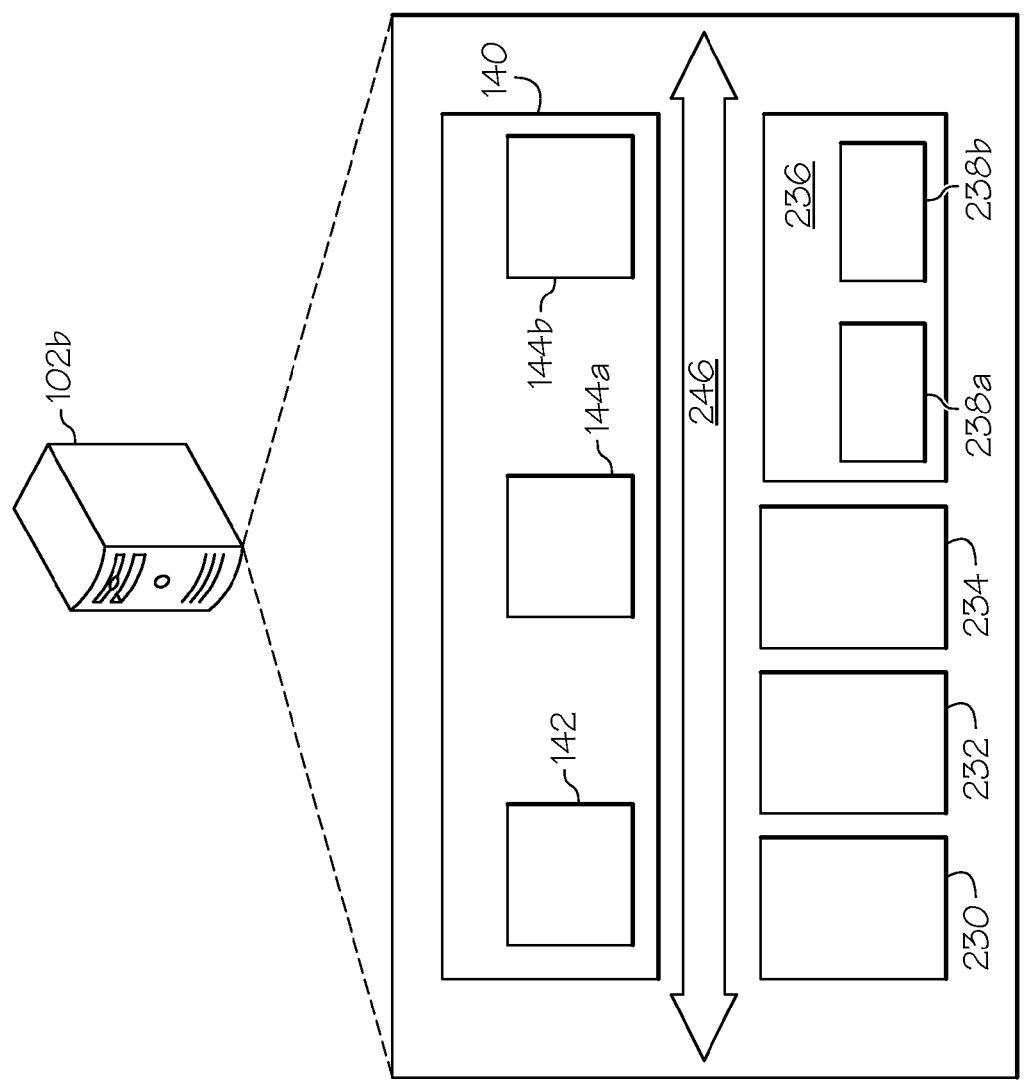
FIG. 2 depicts a remote computing device for linking items to a matter, according to one or more embodiments shown and described herein.

FIG. 2 depicts the remote computing device 102b for linking items to a matter, according to one or more embodiments shown and described herein. In the illustrated embodiment, the user computing device 102a includes a processor 230, input/output hardware 232, network interface hardware 234, a data storage component 236 (which stores legal documents 238a, linking data 238b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums.

Depending on the particular embodiment, these non-transitory computer-readable mediums may reside within the remote computing device 102b and/or external to the remote computing device 102b.

Additionally, the memory component 140 may store operating logic 242, the searching logic 144a, and the system enterprise logic 144b. The searching logic 144a and the system enterprise logic 144b may each include a plurality of different pieces of logic, each of which may be embodied as a computer program, firmware, and/or hardware, as an example. A local interface 246 is also included in FIG. 2 and may be implemented as a bus or other interface to facilitate communication among the components of the user computing device 102a.

The processor 230 may include any processing component operable to receive and execute instructions (such as from the data storage component 236 and/or the memory component 140). The input/output hardware 232 may include and/or be configured to interface with a monitor, positioning system, keyboard, mouse, printer, image capture device, microphone, speaker, gyroscope, compass, and/or other device for receiving, sending, and/or presenting data. The network interface hardware 234 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the user computing device 102a and other computing devices.

The operating logic 242 may include an operating system and/or other software for managing components of the user computing device 102a. Similarly, as discussed above, the searching logic 144a may reside in the memory component 140 and may be configured to cause the processor 230 to provide one or more search functions. As an example, the searching logic 144a may provide legal searching capabilities for court opinions, briefs, motions, and/or other legal documents. Similarly, the system enterprise logic 144b may be utilized to link the legal (and/or other) documents to a common matter to provide more efficient searching. As an example, the system enterprise logic 144b may be configured to determine whether legal documents relate to a particular litigation. If so, those legal documents may be linked together such that a user searching for that litigation will be able to easily find all documents available for that litigation. Other functionality is also included and described in more detail, below.

It should be understood that the components illustrated in FIG. 2 are merely exemplary and are not intended to limit the scope of this disclosure. While the components in FIG. 2 are illustrated as residing within the remote computing device 102b, this is merely an example. In some embodiments, one or more of the components may reside external to the remote computing device 102b. It should also be understood that, while the remote computing device 102b in FIG. 2 is illustrated as a single device, this is also merely an example. In some embodiments, the searching logic 144a and the system enterprise logic 144b may reside on different devices.

Additionally, while the remote computing device 102b is illustrated with the searching logic 144a and the system enterprise logic 144b as separate logical components, this is also an example. In some embodiments, a single piece of logic may cause the remote computing device 102b to provide the described functionality.

Figure 3:
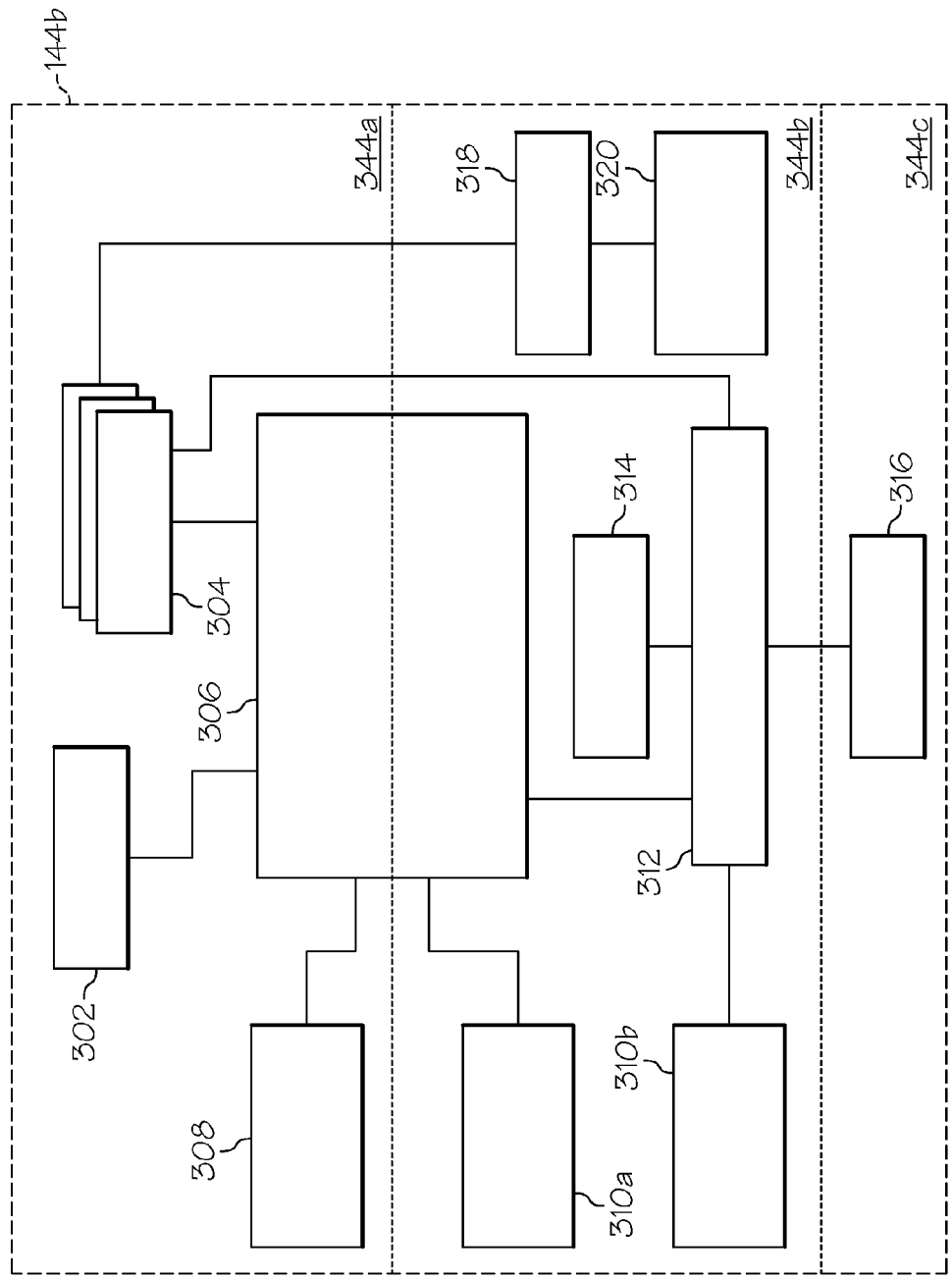
FIG. 3 depicts an embodiment of the system enterprise logic, according to one or more embodiments shown and described herein.

FIG. 3 depicts an embodiment of the system enterprise logic 144b, according to one or more embodiments shown and described herein. As illustrated in FIG. 3, the system enterprise logic 144b may be configured to facilitate operation of one or more levels of infrastructure, including master level 344a, a shared service level 344b, and an application level 344c. At the master level, an alcit master component 302 and a content master component 304 may be included. The alcit master component 302 may be configured to store citation information that indicates relationships among courts in the court system. The content master component 304 may be configured to retrieve and/or store one or more legal documents, such as cases, verdicts, pleadings, jury instructions, transcripts, dockets, motions, briefs, and/or other legal and non-legal data.

Also included in the system enterprise logic 144b is a legal matter linking (LML) master component 306. The LML master component 306 may be configured to receive the documents from the content master component 304, as well as data from the alcit master component 302, to determine commonalities between the received documents. From the determined commonalities, the LML master component 306 can cause the remote computing device 102b (FIGS. 1 and 2) to create a new (or supplement an existing) legal matter by which to link legal documents. Also coupled to the LML master component 306 is a legal matter linking (LML) editorial interface 308, which may be configured to provide an editor or other administrator with one or more options for changing parameters for linking legal documents. These options may include the ability to correct previously determined links among legal documents and/or legal matters, as well as change weightings, thresholds, and/or other parameters. Similarly, system management instrumentation component 310a may also be coupled to the LML master component 306 and may be configured for providing other administrative options.

In the shared service level 344b and coupled to the LML master component 306 is a legal matter linking (LML) distribution component 312. The LML distribution component 312 may be configured to cause the remote computing device 102b to receive data from the LML master component 306, as well as document data from a content search and retrieval component 314 to associate the content with the relationships determined by the LML master component 306. This relationship may be transmitted on the application level 344c to be provided to a user on a network site 316.

Also included in the shared service level 344b is system management instrumentation component 310b that is coupled to the LML distribution component 312. The system management instrumentation component 310b may have similar functionality as the system management instrumentation component 310a. Also included is an internet web service (IWS) component 318 for providing internet access to an alcit server 320. The alcit server 320 is also a software component and is configured to provide access to citation information, which is then provided through the IWS component 318, to the content master component 304.

Figure 4:
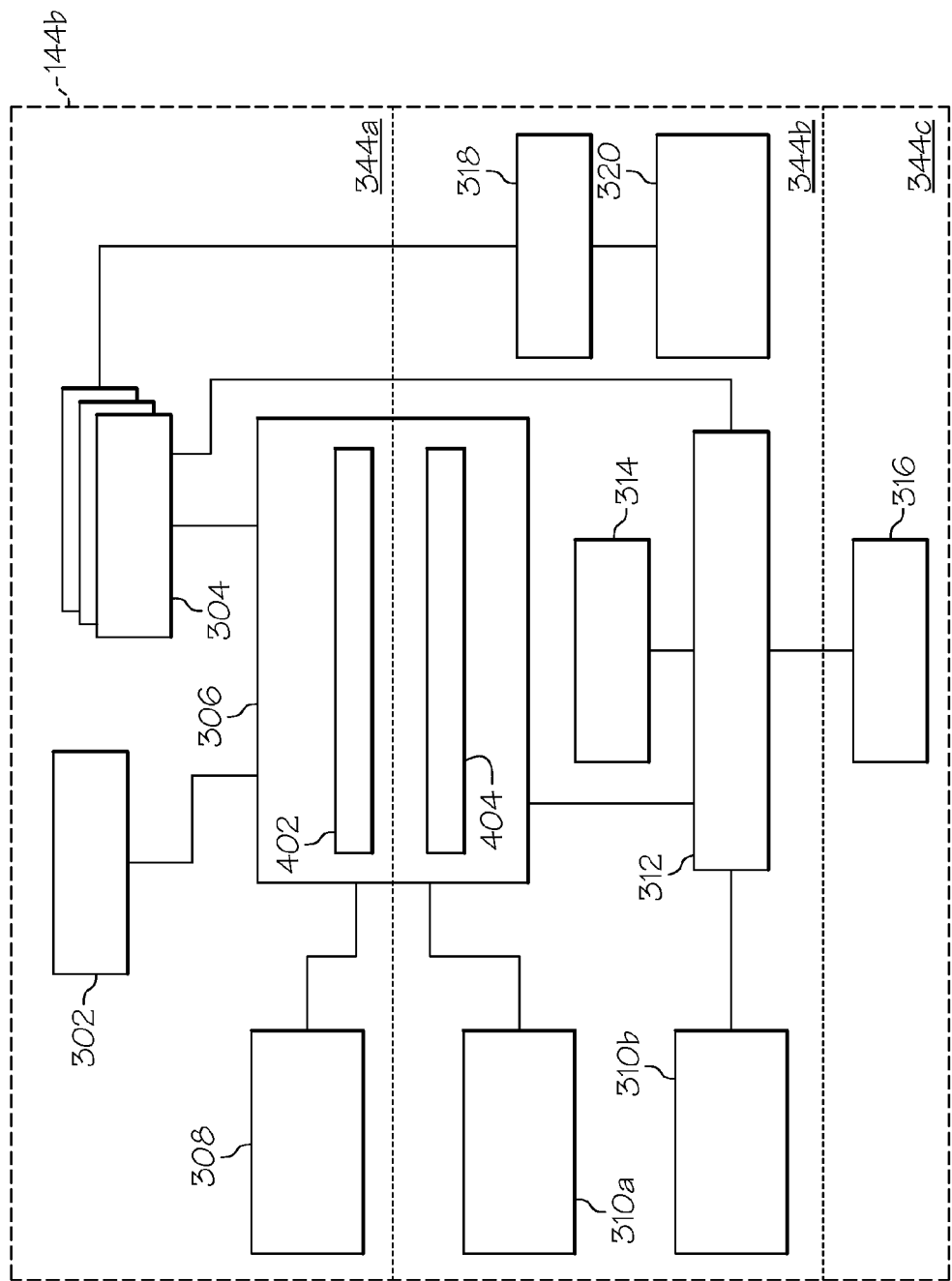
FIG. 4 depicts another embodiment of the system enterprise logic, further illustrating components of the legal matter linking master component, according to one or more embodiments shown and described herein.

FIG. 4 depicts another embodiment of the system enterprise logic 144b, further illustrating components of the legal matter linking master component, according to one or more embodiments shown and described herein. As illustrated, the logic depicted in FIG. 4 is similar to the logic of FIG. 3, with the exception that the LML master component 306 in FIG. 4 is expanded to illustrate a web application 402 and a controller 404. In operation, the web application 402 may include any network application that acts as a web framework component that contains business logic and returns hypertext transfer protocol (HTTP) and/or other network responses. Similarly, the controller 404 may be configured as a web (or other network) software framework component that handles HTTP (or other network protocols), as well as routing and other functions.

Figure 5:
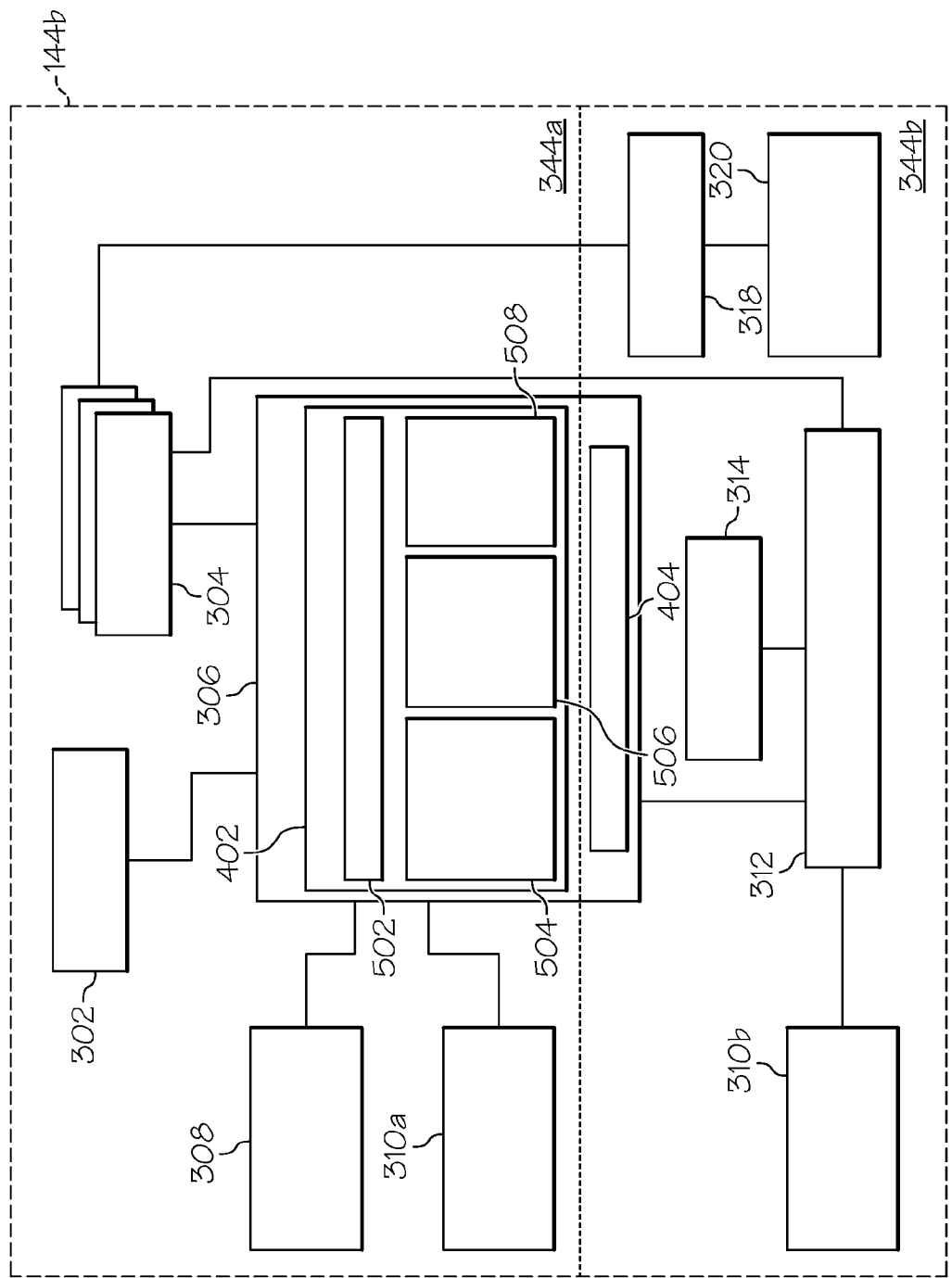
FIG. 5 depicts the system enterprise logic, further illustrating components within a web application of the legal matter linking master, according to one or more embodiments shown and described herein.

FIG. 5 depicts the system enterprise logic 144*b*, further illustrating components within the web application 402 of the LML master component 306, according to one or more embodiments shown and described herein. More specifically, within the web application 402 of the LML master component 306, the system enterprise logic 144*b* includes a storage manager 502, which is coupled to docket number normalization handlers 504, legal matter master report handlers 506, and extraction and auto-matching handlers 508. Embodiments of the storage manager 502 are configured to manage internal storage for the network framework. The docket number normalization handlers 504 may be configured for handling, scanning, and normalization of an identifier, such as a document number, as well as managing rules associated with the scanning and normalization process.

The legal matter master report handlers 506 may be configured to handle searching, browsing, retrieving, modifying, and publishing legal matter resources. More specifically, the legal matter master report handlers 506 may be configured to cause the remote computing device 102*b* to allow searching of legal matters against metadata, such as citations. The legal matter master report handlers 506 may be configured to cause the remote computing device 102*b* to produce matters as stored in the LML master component 306. The legal matter master report handlers 506 may be configured to cause the remote computing device 102*b* to provide modifications to master relationships, allow for creation and/or modification of linking relationships, and manage creation and management of files for a publish interface.

Similarly, the extraction and auto-matching handlers 508 may be configured to cause the remote computing device 102*b* to handle extraction of items from documents, link documents together based on generated values, as well as handle internal data storage relationships associated with the creation of new table entries. Further, the extraction and auto-matching handlers 508 may be configured to cause the remote computing device 102*b* to acquire data from content sources and send meta-documents to queue. Similarly, the extraction and auto-matching handlers 508 may be configured to cause the remote computing device 102*b* to normalize data to a predetermined format, create hash keys, identify legal matters with reliability match, and send these results to queue, as well as combine legal matters with alcit information.

Figure 6:
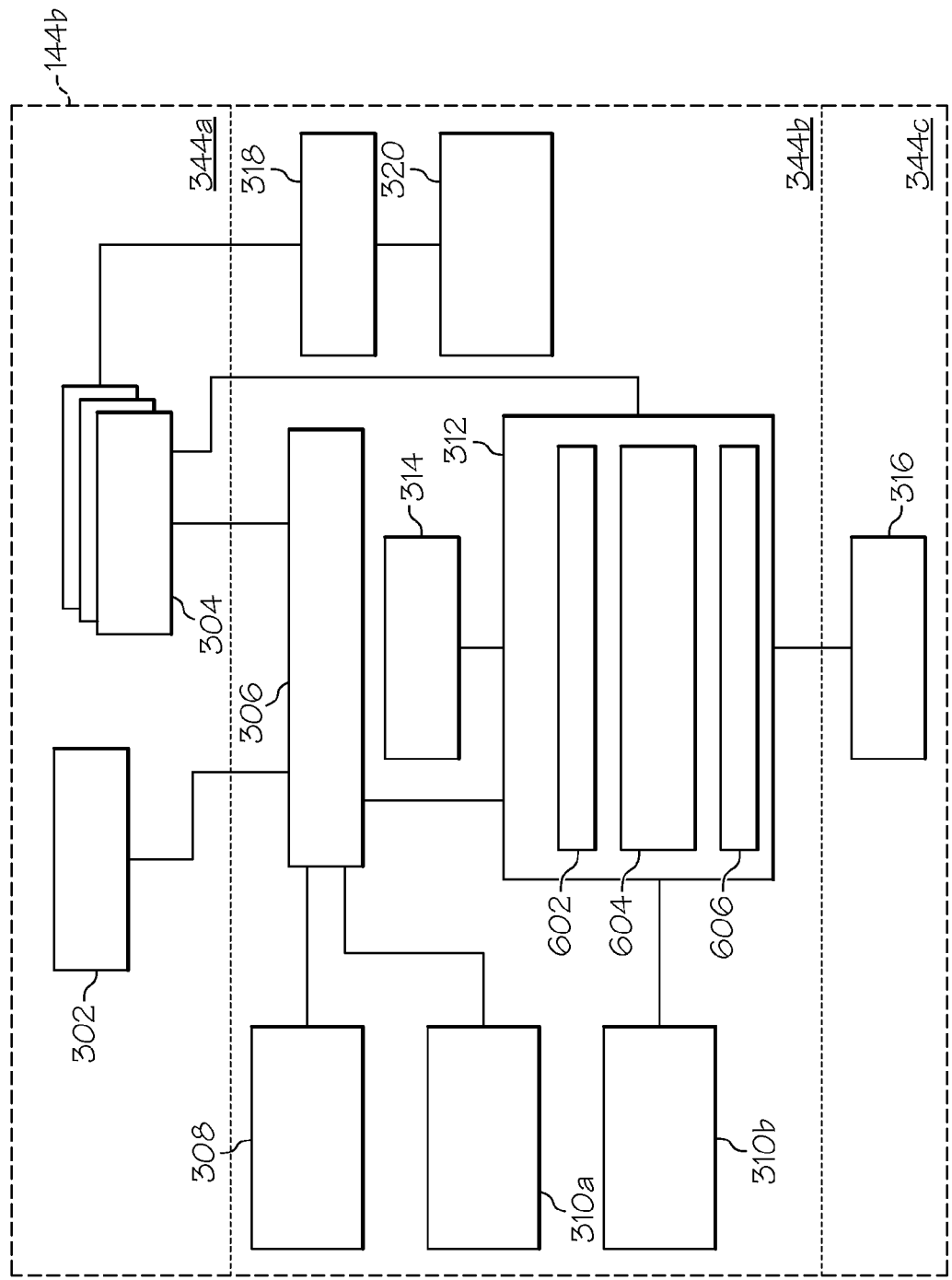
FIG. 6 depicts another embodiment of the system enterprise logic, further illustrating components of the legal matter linking distribution component, according to one or more embodiments shown and described herein.

FIG. 6 depicts another embodiment of the system enterprise logic 144*b*, further illustrating components of the LML distribution component 312, according to one or more embodiments shown and described herein. More specifically, FIG. 6 depicts a storage manager 602 and a legal matter report distribution handlers 604 within the LML distribution component 312. The legal matter report distribution handlers 604 may be configured to cause the remote computing device 102*b* to handle searching, browsing, and retrieving of legal matters combined with other master data. Similarly, the legal matter report distribution handlers 604 may be configured to allow for searching of legal matters against stored metadata, such as citations. The legal matter report distribution handlers 604 may be configured to cause the remote computing device 102*b* to produce matters with purpose copy information, as well as manage read and process publish files from masters. A controller 606 is also included and may provide similar functionality as the controller 404, from FIG. 4.

Figure 7:
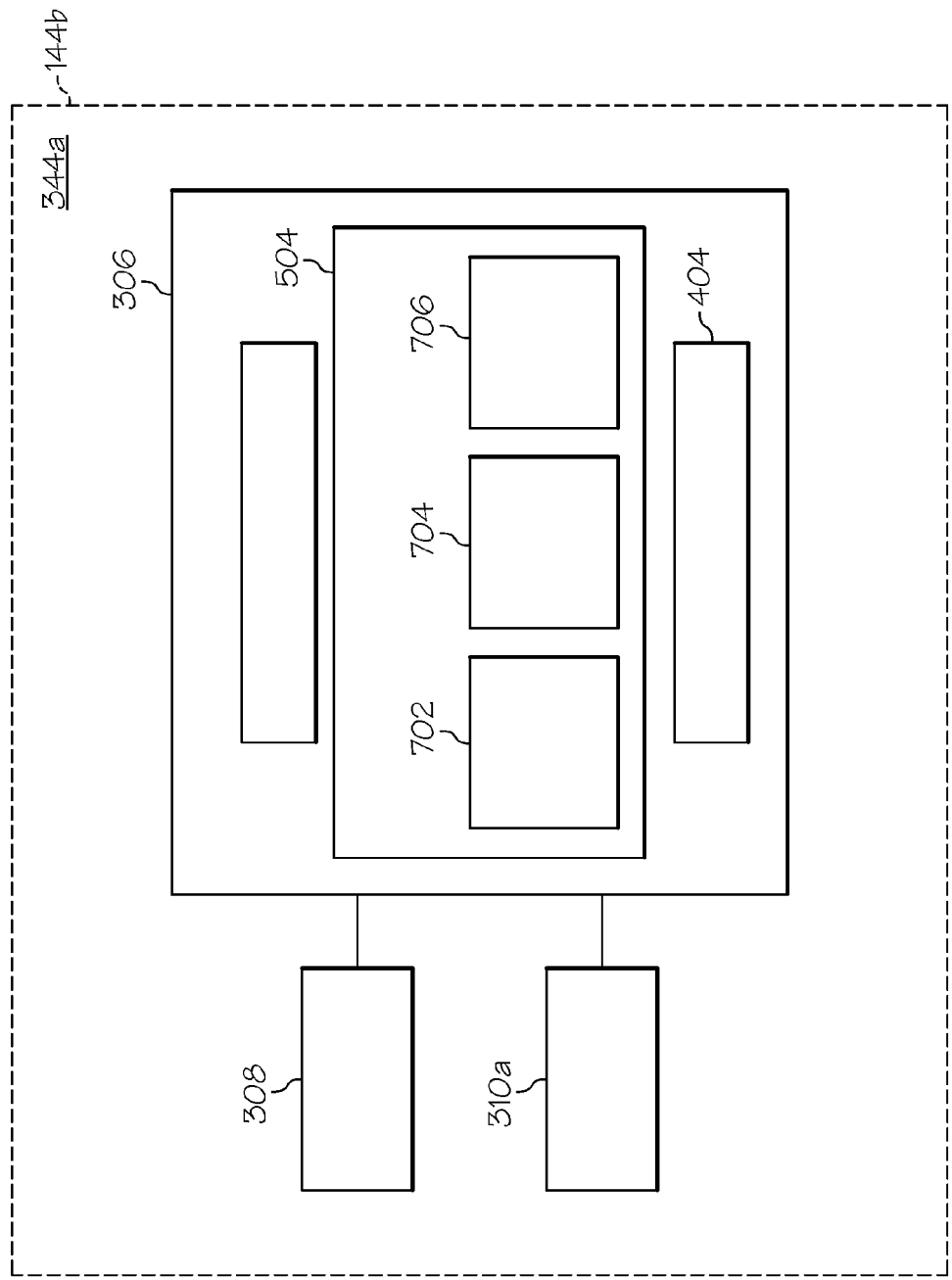
FIG. 7 depicts components of the docket number normalization handlers, according to one or more embodiments shown and described herein.

FIG. 7 depicts components of the docket number normalization handlers 504, according to one or more embodiments shown and described herein. As illustrated in FIG. 7, within the docket number normalization handlers 504 (FIG. 5) are a case number by code reports 702, a normalized case number reports 704, and a case number management component 706. The code reports 702 may be configured as a user interface of reports that is provided to an administrator and provides an encoding of a specific court. The normalized case number reports 704 may be configured as a user interface that provides the normalized case numbers to an administrator. More specifically, as discussed in more detail below, upon determining a docket number, the system enterprise logic 144*b* can cause the remote computing device 102*b* to normalize the docket number, such that all docket numbers conform to a common format. Accordingly, the normalized case number reports 704 may provide an interface relaying this information. The case number management component 706 may be configured to cause the remote computing device 102*b* to manage the docket numbers. The case number management component 706 may be configured as a user interface; however, this is not a requirement.

Figure 8:
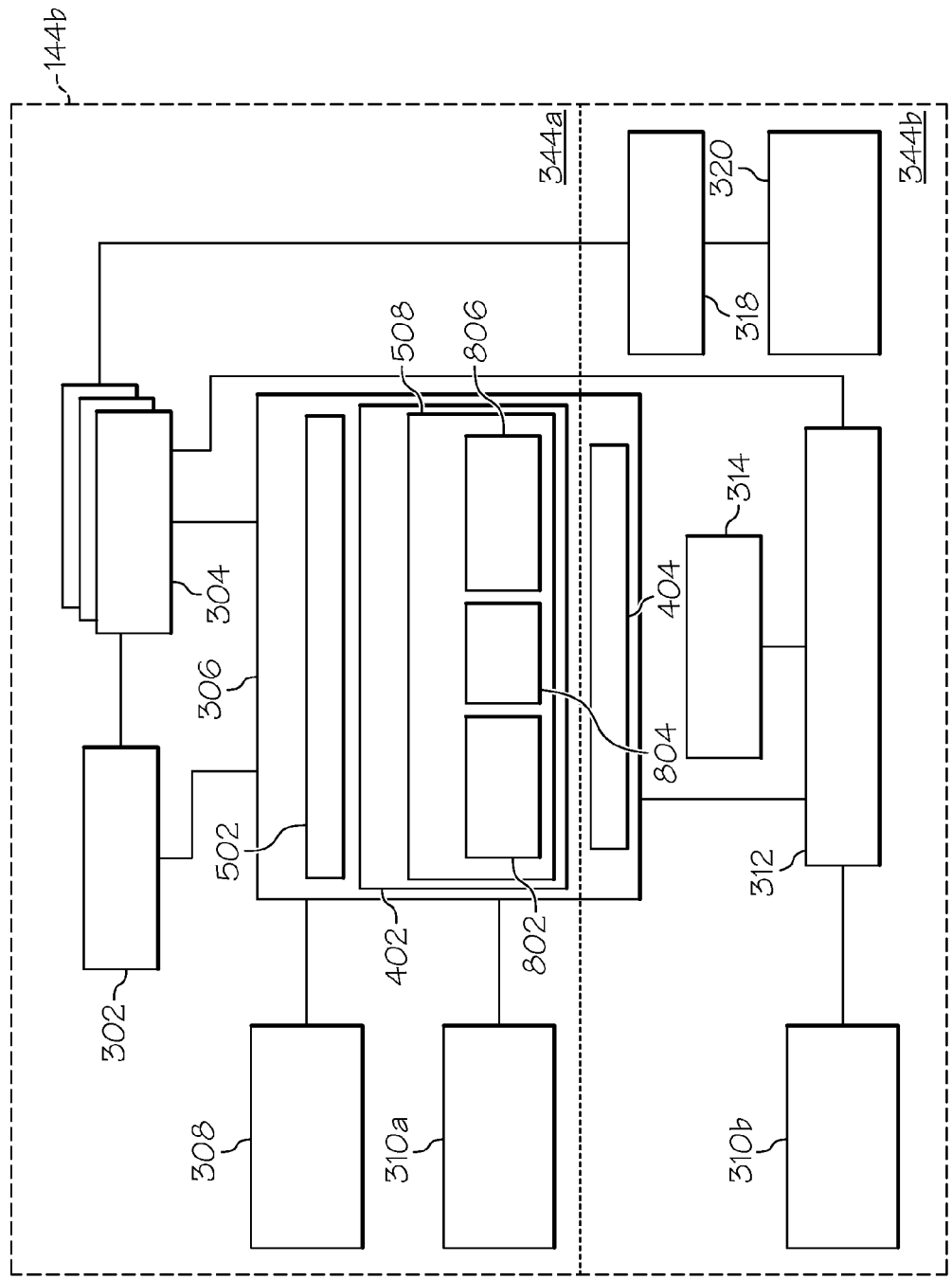
FIG. 8 depicts the extraction and auto-matching handlers, according to one or more embodiments shown and described herein.

FIG. 8 depicts the extraction and auto-matching handlers 508, according to one or more embodiments shown and described herein. As illustrated in FIG. 8, within the web application 402 and extraction and auto-matching handlers 508 (FIG. 5) of the LML master component 306 are a data acquisition component 802, a linking component 804, and a post-linking component 806, which may be configured with the functionality described with regard to the extraction and auto-matching handlers 508. As discussed in more detail below, the extraction and auto matching handlers may cause the remote computing device 102*b* to link one or more electronic documents (such as electronic legal document) to common matters. To provide this functionality, the data acquisition component 802 may be configured to cause the remote computing device 102*b* acquire data about the document. The linking component 804 may cause the remote computing device 102*b* to link a document to a previously determined matter. The post-linking component 806 may be configured to cause the remote computing device 102*b* to retrieve a case law history related to the document, update the storage manager 502, and/or perform other actions.

Figure 9:
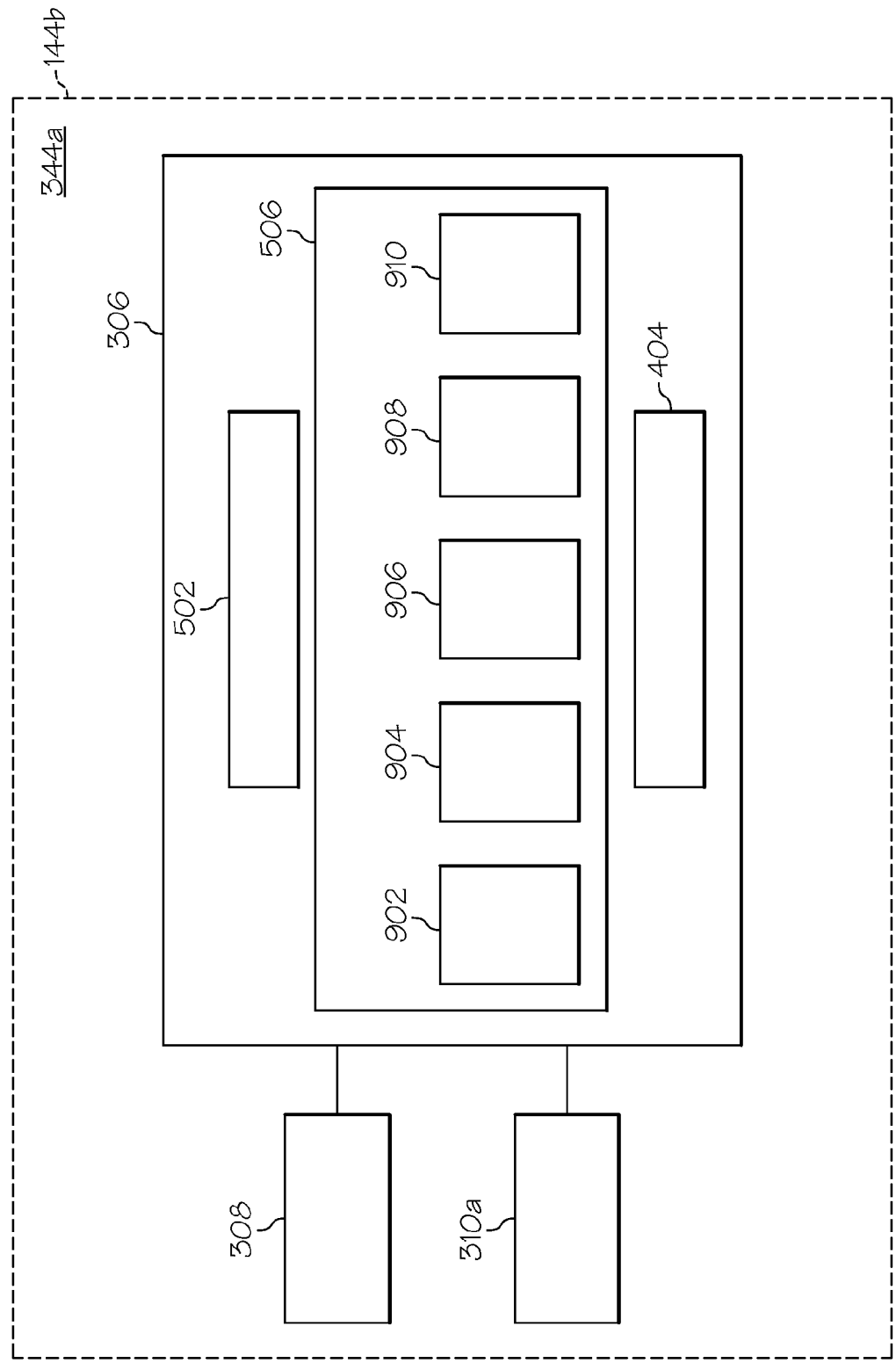
FIG. 9 depicts components of the legal master report handlers, according to one or more embodiments shown and described herein.

FIG. 9 depicts components of the legal matter master report handlers 506, according to one or more embodiments shown and described herein. As illustrated in FIG. 9, the legal matter master report handlers 506 (FIG. 3) may include a search component 902, a master reports 904, a history reports 906, a link manager component 908, and a publish manager component 910. The search component 902 may be configured as a user interface that provides searching capabilities. Similarly, the matter reports 904 may include a user interface that provides the administrator with information regarding the determined matters. The link manager 908 may be configured as a user interface for providing creation and/or edit options for links to an administrator. The publish manager component 910 may be configured as a user interface for providing the administrator options for managing the publication of the alterations made the administrator.

Figure 10:
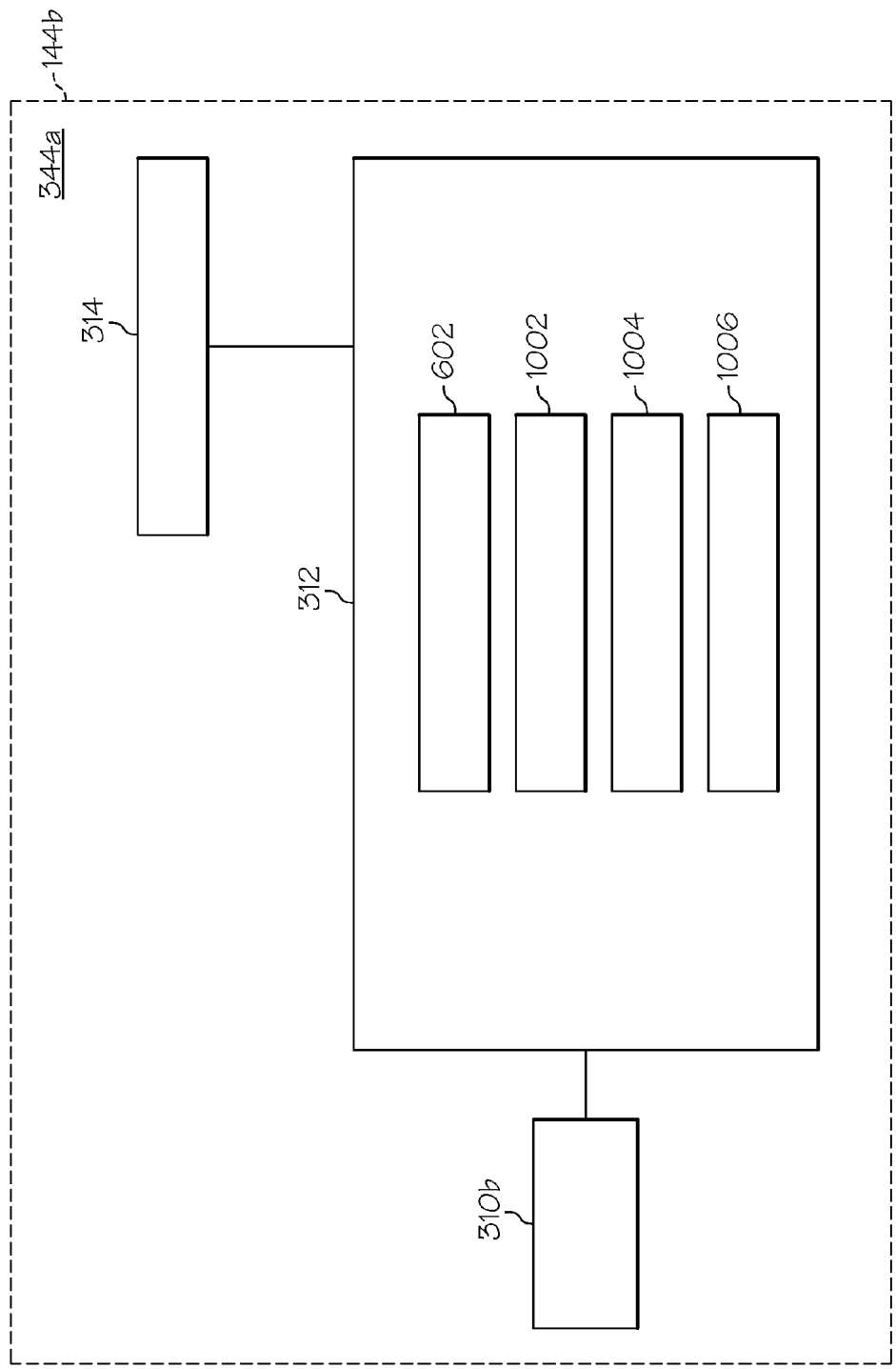
FIG. 10 depicts components of the legal matter linking distribution component, according to one or more embodiments shown and described herein.

FIG. 10 depicts components of the LML distribution component 312, according to one or more embodiments shown and described herein. As illustrated in FIG. 10, the LML distribution component 312 may include the storage manager 602 (FIG. 6), a purpose copy manager 1002, a search component 1004 and a master reports 1006. The purpose copy manager 1002 may be configured to cause the remote computing device 102b to manage distribution of the links to the network site. More specifically, the purpose copy manager 1002 may copy information for providing to the network site. The search component 1004 may cause the remote computing device 102b to provide searching functionality with regard to searching of the documents. The matter reports 1006 may cause the remote computing device 102b to provide a user interface that provides information related to the matters and the documents to which the matters are assigned.

Figure 11:
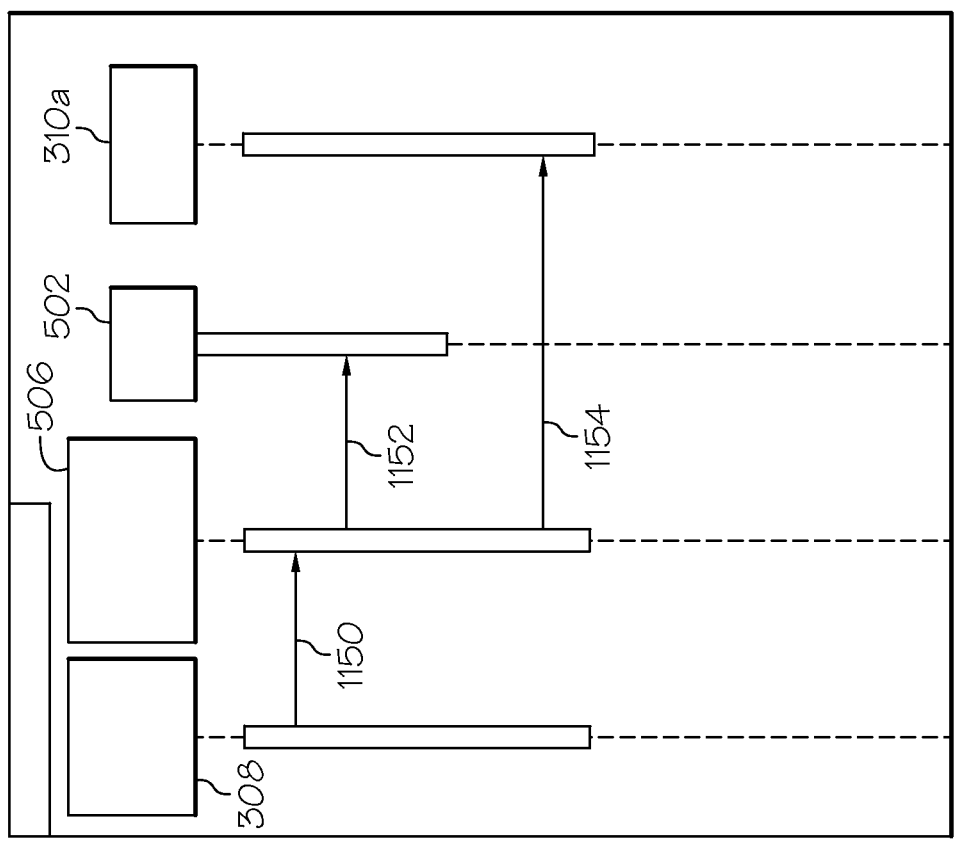
FIG. 11 depicts an editorial interaction, according to one or more embodiments shown and described herein.

FIG. 11 depicts an editorial interaction, according to one or more embodiments shown and described herein. As illustrated in FIG. 11, an administrator may cause the LML editorial interface 308 (FIG. 3) may send a representative state transfer (REST) request 1150 to the legal matter master report handlers 506 (FIG. 5). The legal matter master report handlers 506 may cause the remote computing device 102b to send a structured query language (SQL) request 1152 to the storage manager 502 (FIG. 5). This allows the administrator to initiate a change to a link between a document and a matter. Additionally, the legal matter master report handlers 506 may cause the remote computing especially 102b to facilitate installation and logging 1154 with the system management instrumentation component 310a (FIG. 3).

Figure 12:
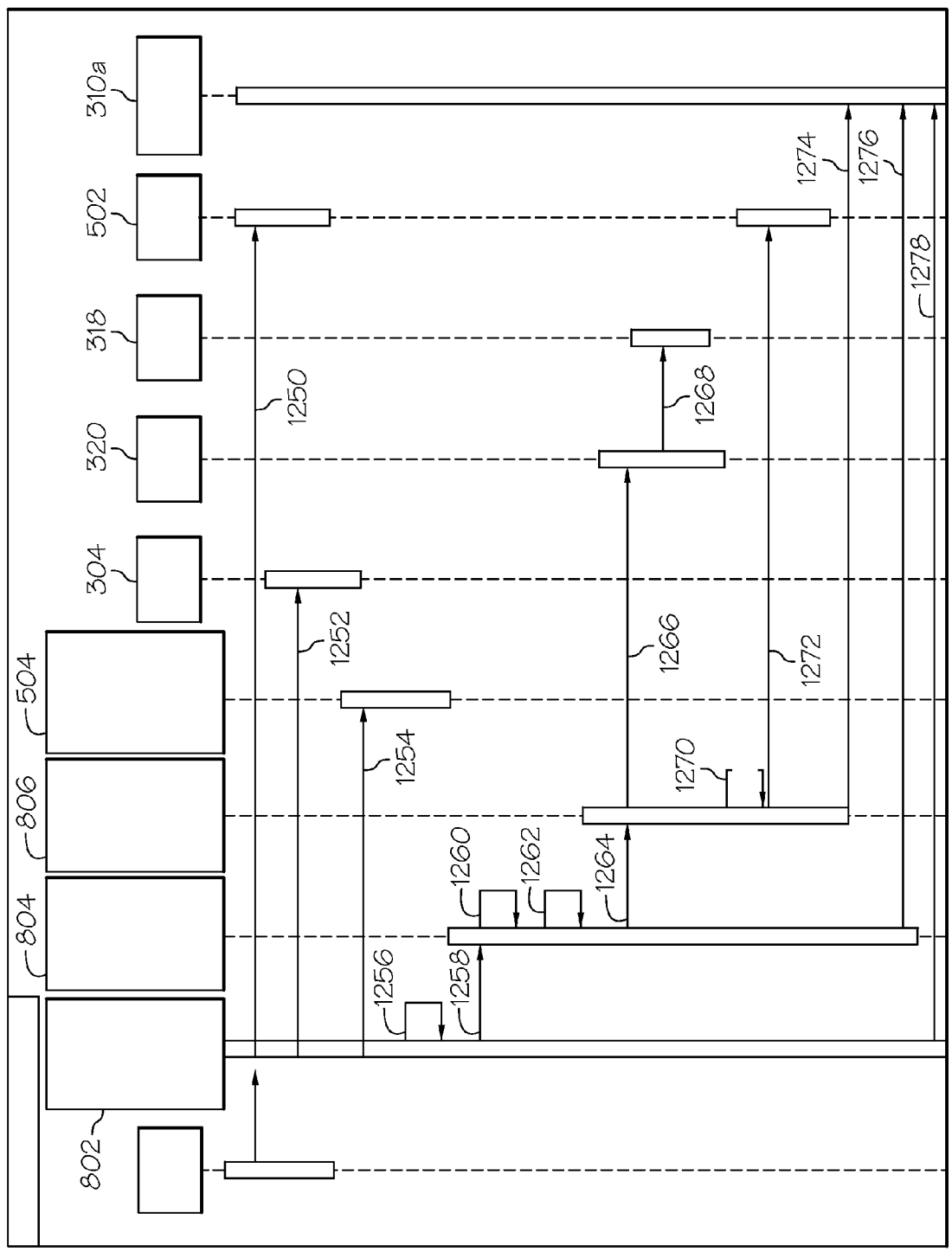
FIG. 12 depicts data logging and analysis, according to one or more embodiments shown and described herein.

FIG. 12 depicts a data logging and analysis, according to one or more embodiments shown and described herein. As illustrated in FIG. 12, the data acquisition component 802 (FIG. 8) of the extraction and auto-matching handlers 508 (FIG. 5) can send an SQL get configuration request 1250 to the storage manager 502. The SQL get configuration request 1250 may include a request for instructions. In response, the storage manager 502 may return the requested configuration information. The data acquisition component 802 may also send a get content request 1252 to the content search and retrieval component 314 (FIG. 3), based on the received configuration information. The get content request 1252 includes a request for a document and may depend on the information received from the SQL get configuration request 1250. Additionally, the get content request 1252 may include a request to extract predetermined data (e.g., as identified in the configuration information) from the retrieved document. The data acquisition component 802 may also send a normalized docket number value request 1254 to the docket number normalization handlers 504. More specifically, once the document is retrieved, a docket number for that document may be determined. The data acquisition component 802 can then normalize the fields 1256 to create a uniform docket number across all documents. The data acquisition component 802 may additionally send meta-documents 1258 to the linking component 804 of the extraction and auto-matching handlers 508. The linking component 804 can create at least one hash pair 1260 associated with the meta-documents to increase speed. The linking component 804 may additionally identify 1262 related legal matters associated with those meta-documents, and send 1264 the meta-documents to the post-linking component 806 of the extraction and auto-matching handlers 508. The post-linking component 806 can access 1266 case law history from the IWS component 318, which obtains 1268 the case law history from the alcit server 320 (FIG. 3). The post-linking component 806 can additionally fold 1270 legal matters and request 1272 an update of legal matters from the storage manager 502 (FIG. 5). The data acquisition component 802, the linking component 804, and the post-linking component 806 can then perform instrumentation and logging 1276, 1278 with the system management instrumentation component 310a.

Figure 13:
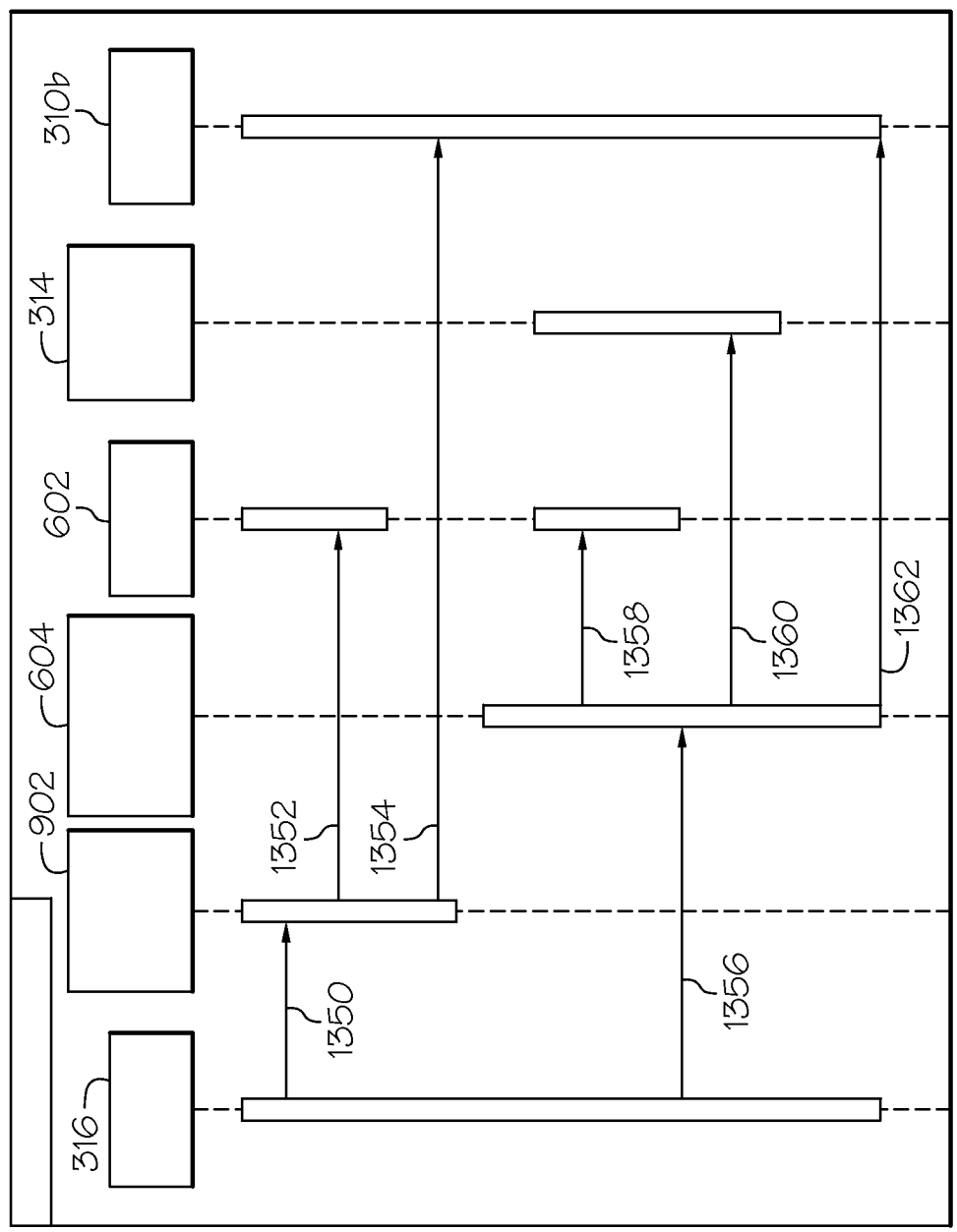
FIG. 13 depicts a network site interaction, according to one or more embodiments shown and described herein.

FIG. 13 depicts a network site interaction, according to one or more embodiments shown and described herein. As illustrated in FIG. 13, the network site 316 (FIG. 6) can send a search request 1350 to the search component 902 (FIG. 9) of the legal matter report distribution handlers 604 (FIG. 6). The search request 1350 may be for a search initiated by a user. In response, the search component 902 can send 1352 an SQL request to the storage manager 602 (FIG. 4) to determine electronic documents that are related to search. The search component 902 can also perform instrumentation and logging 1354 with the system management instrumentation component 310b (FIG. 6). Additionally, the network site 316 can send 1356 a resource request to the matter reports 904 (FIG. 9) of the legal matter report distribution handlers 604. The resource request may include a request for one or more of the documents retrieved in the search request 1350. The legal matter report distribution handlers 604 can then send 1358 an SQL request to the storage manager 602 to retrieve the requested electronic documents. Additionally, the matter reports 904 can send 1360 an X-query to the content search and retrieval component 314 (FIG. 6) and perform instrumentation and logging 1362 with the system management instrumentation component 310b (FIG. 6).

Figure 14:
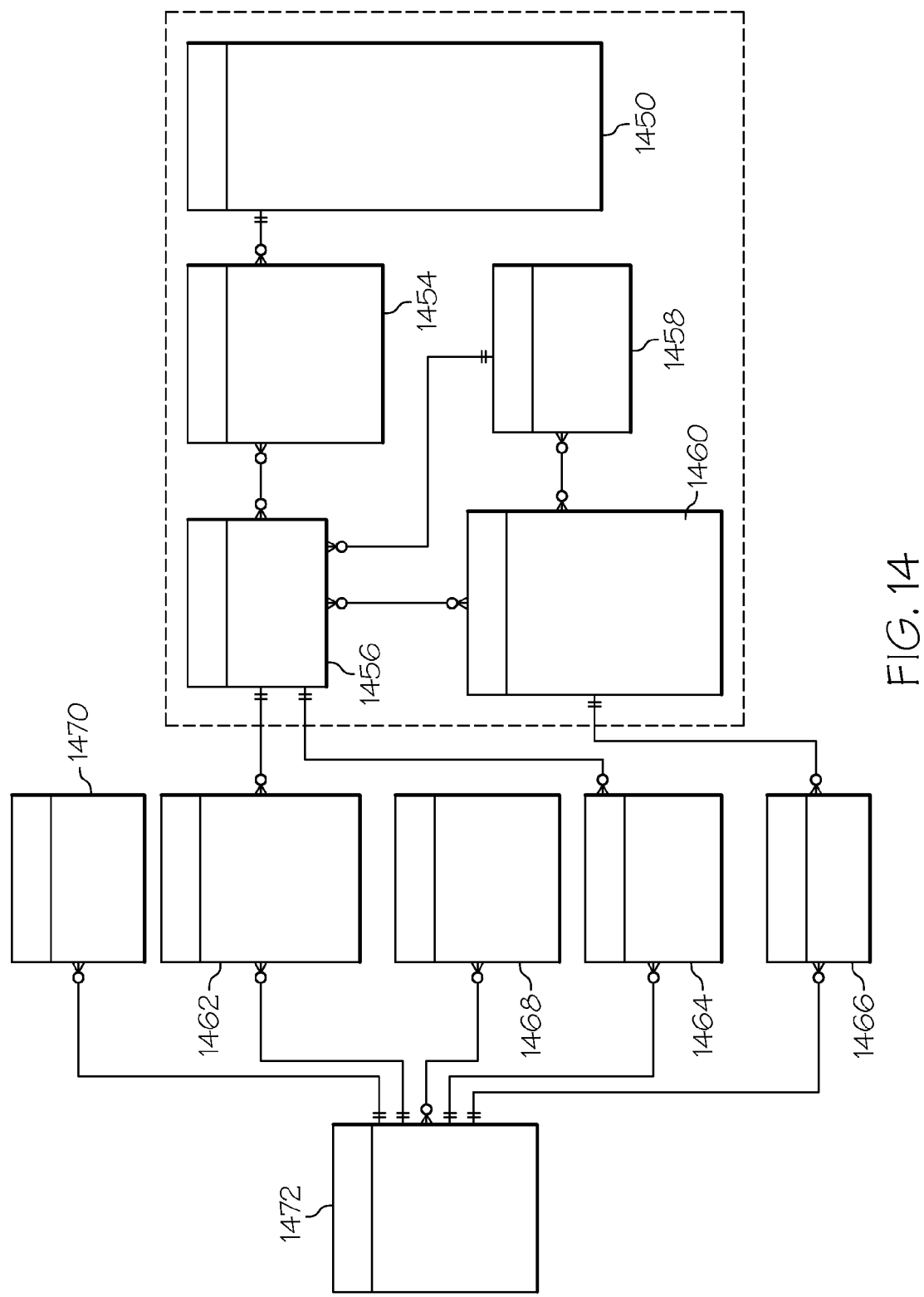
FIG. 14 depicts a legal matter data model, according to one or more embodiments shown and described herein.

FIG. 14 depicts a legal matter data model, according to one or more embodiments shown and described herein. More specifically, FIG. 14 defines criteria that may be utilized in linking documents to legal matters. As illustrated in FIG. 14, a document repository may be organized according to document name, custom name, description, host, username for accessing the repository, password for accessing the repository, access protocol, uniform resource locator (URL), data location, and/or environment (block 1450), and can be used to acquire legal documents. Additionally, document access instructions may be determined and utilized (block 1454). More specifically, the name, input type, expression, and description for accessing the repository may be determined and utilized to access the repository. Further, a document type may be determined (block 1456). The document type may include the nature of legal document that has been accessed. Additionally, at block 1458, an inclusion key may be utilized to indicate weighting for each type of information utilized in determining the legal matter associated with the legal document. Similarly, at block 1460, a document element can be determined, including a name, description, access type, access instructions, and normalizer. Together, the definitions for document repositories, document access instructions, document types, document elements, and inclusion keys allow for the harvesting of data items and keys for linking to be created. As legal matters are altered by the system, legal matter history items (block 1462) may be determined.

The legal matter for the legal document can be determined and a slug, title, description, and creation date may be identified and documented (block 1472). This may be determined from an inclusion hash at block 1470. The legal matter maintains relations to the inclusion hash values (block 1470), the legal matter history items (block 1462), the determined courts (block 1468), the legal matter documents (block 1464), and the legal matter documents (block 1466), which are related to this particular legal matter.

Figure 15:
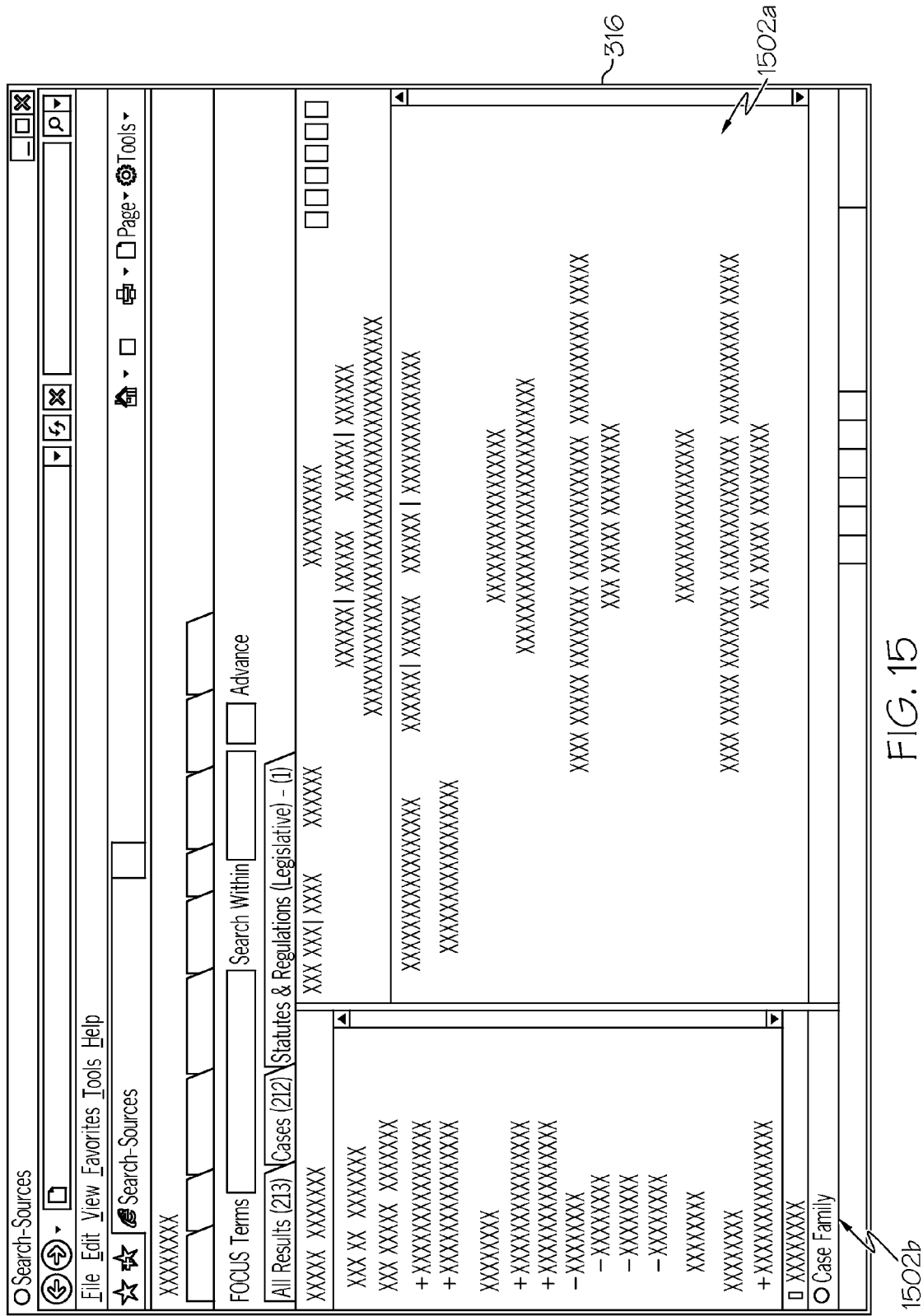
FIG. 15 depicts a user interface for providing data to an end-user, according to one or more embodiments shown and described herein.

FIG. 15 depicts a user interface for providing data to an end-user, according to one or more embodiments shown and described herein. As illustrated in FIG. 15, the user interface 1500 may include a plurality of windows 1502a and 1502b. The window 1502a may be provided to an end-user in response to the end-user search a legal matter or document. In addition to providing the requested legal document, the interface may also provide other documents associated with the same legal matter, as illustrated in window 1502b. Included in the legal matter of FIG. 15 are prior and subsequent proceedings, filings, and transcripts. Additionally, each category of legal document may have specific documents that pertain to those categories. By selecting a legal document in window 1502b, the end-user may be provided with the selected document in window 1502a, while the related legal documents in the legal matter may still be provided in window 1502b.

FIG. 16 depicts a process that may be utilized for linking items to a matter, according to one or more embodiments shown and described herein. As illustrated in block 1630, an electronic document may be received from a source or plurality of sources. More specifically, the remote computing device 102b (FIGS. 1 and 2) may retrieve a legal document from a court database and/or other source. At block 1632, the remote computing device 102b can determine whether the retrieved electronic document is associated with a legal matter. As discussed above, depending on the embodiment, this determination can be made solely from a docket number and/or from a compilation of data retrieved from the electronic document, which is weighted and then compared to a threshold weight. Regardless, at block 1634, in response to determining that the electronic document is associated with the predetermined first matter, the remote computing device 102b can link the electronic document to the predetermined first matter, such that accessing the first document will provide access to other documents linked to the first matter. At block 1636, in response to determining that the electronic document is not associated with the predetermined first matter, the remote computing device 102b may create a second matter and link the electronic document to the second matter, such that accessing the electronic document will provide other documents linked to the second matter. At block 1638, the remote computing device 102b can receive a request for the first document. At block 1640, in response to receiving the request for the first document, the remote computing device 102b can provide a user option for access to the other documents linked to the first matter.

As discussed above, embodiments disclosed herein provide systems and methods for linking items to a matter. More specifically, some embodiments may electronically retrieve legal documents from public records and cause those legal documents to be linked to a legal matter, such as a litigation. By linking the legal documents to a legal matter, a user may perform a search for the legal matter and may also have access to other legal documents in that legal matter without having to perform additional searching. Other features and embodiments are also described.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for linking items into a matter comprising:
   retrieving an electronic document from a source;
   determining whether the electronic document is associated with a predetermined matter;
   in response to determining that the electronic document is associated with the predetermined matter, linking the electronic document to the predetermined matter, such that accessing the electronic document will provide access to other documents linked to the predetermined matter;
   in response to determining that the electronic document is not associated with the predetermined first matter, create a second matter and link the electronic document to the second matter, such that accessing the electronic document will provide other documents linked to the second matter;
   receiving a request for the electronic document; and
   in response to receiving the request for the electronic document, providing a user option to provide access to the other documents linked to the predetermined matter.

2. The method of claim 1, further comprising:
   determining an identifier of the electronic document; and
   normalizing the identifier to a predetermined format.

3. The method of claim 2, further comprising creating at least one hash pair from the identifier.

4. The method of claim 1, further comprising providing the electronic document in a user interface.

5. The method of claim 1, further comprising determining the source from which to retrieve the electronic document, the source being determined from a plurality of sources, wherein retrieving the electronic document includes requesting content, based on the source that was determined.

6. The method of claim 1, wherein the electronic document comprises an identifier, wherein determining whether the electronic document is associated with the predetermined matter comprises normalizing the identifier and normalizing a field within the identifier.

7. The method of claim 1, wherein determining whether the electronic document is associated with a predetermined first matter includes analyzing at least one of the following: a docket number on the electronic document and a compilation of data retrieved from the electronic document.

8. A system for linking items into a matter comprising:
   a computing device that comprises a memory component that stores at least the following:
   content master that causes the computing device to retrieve an electronic document from a source;
   a linking component that causes the computing device to perform at least the following:
   determine whether the electronic document is associated with a predetermined first matter;
   in response to determining that the electronic document is associated with the predetermined first matter, link the electronic document to the predetermined first matter, such that accessing the electronic document will provide access to other documents linked to the predetermined first matter; and
   in response to determining that the electronic document is not associated with the predetermined first matter, create a second matter and link the electronic document to the second matter, such that accessing the electronic document will provide other documents linked to the second matter; and
   search logic that causes the computing device to receive a request for the electronic document and, in response to receiving the request for the electronic document, provide a user option to provide access to the other documents linked to the predetermined first matter.

9. The system of claim 8, wherein the computing device further stores a data acquisition component that causes the computing device to determine an identifier of the electronic document and normalize the identifier to a predetermined format.

10. The system of claim 9, wherein the linking component further causes the computing device to create at least one hash pair from the identifier.

11. The system of claim 8, wherein the computing device further stores a web application that causes the computing device to provide the electronic document in a user interface.

12. The system of claim 8, wherein the computing device further stores a data acquisition component that causes the computing device to determine the source from which to retrieve the electronic document, the source being determined from a plurality of sources, wherein retrieving the electronic document includes requesting content, based on the source that was determined.

13. The system of claim 8, wherein the electronic document comprises an identifier and wherein determining whether the electronic document is associated with the predetermined first matter comprises normalizing the identifier and normalizing a field within the identifier.

14. The system of claim 8, wherein the computing device further stores a post-linking component that causes the computing device to update a storage manager to reflect changes in the predetermined first matter and the second matter.

15. A non-transitory computer-readable medium for linking items into a matter that stores a program that, when executed by a computing device, causes the computing device to perform at least the following:
   retrieve an electronic document from a source;
   determine whether the electronic document is associated with a predetermined first matter;
   in response to determining that the electronic document is associated with the predetermined first matter, link the electronic document to the predetermined first matter, such that accessing the electronic document will provide access to other documents linked to the predetermined first matter;
   in response to determining that the electronic document is not associated with the predetermined first matter, create a second matter and linking the electronic document to the second matter, such that accessing the electronic document will provide other documents linked to the second matter;
   receive a request for the electronic document; and
   in response to receiving the request for the electronic document, provide a user option to provide access to the other documents linked to the predetermined first matter.

16. The non-transitory computer-readable medium of claim 15, wherein the program further causes the computing device to perform at least the following:
   determine an identifier of the electronic document; and
   normalize the identifier to a predetermined format.

17. The non-transitory computer-readable medium of claim 16, wherein the program further causes the computing device to create at least one hash pair from the identifier.

18. The non-transitory computer-readable medium of claim 15, wherein the program further causes the computing device to provide the electronic document in a user interface.

19. The non-transitory computer-readable medium of claim 15, wherein the program further causes the computing device to determine the source from which to retrieve the electronic document, the source being determined from a plurality of sources, wherein retrieving the electronic document includes requesting content, based on the source that was determined.

20. The non-transitory computer-readable medium of claim 15, wherein the electronic document comprises an identifier, wherein determining whether the electronic document is associated with the predetermined first matter comprises normalizing the identifier and normalizing a field within the identifier.

* * * * *